Feb. 7, 1933.  O. A. CHERRY  1,896,070
MOLDED GEAR
Filed June 17, 1931
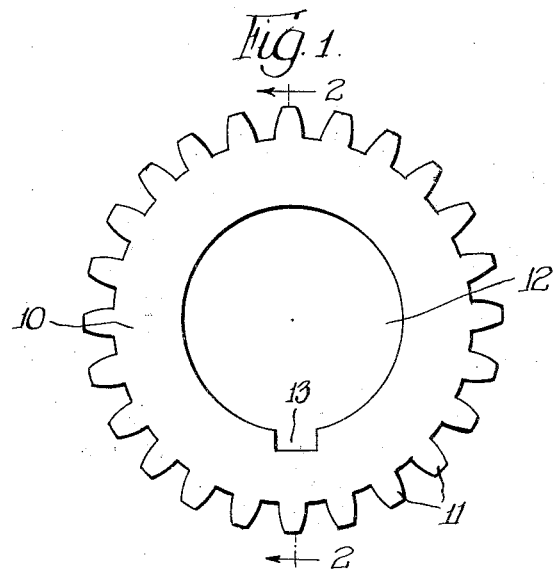
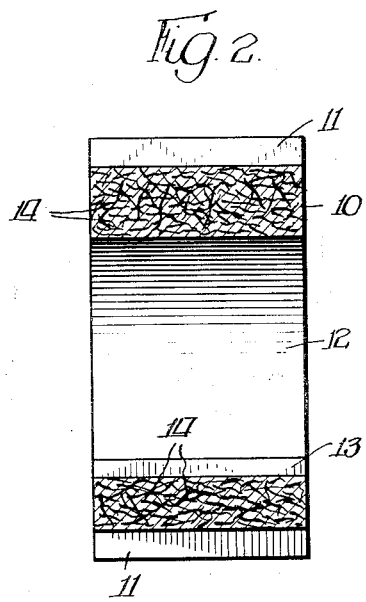
Inventor:
Oscar A Cherry,
By Wilkinson, Huxley, Byron, & Knight  attys.

Patented Feb. 7, 1933

1,896,070

UNITED STATES PATENT OFFICE

OSCAR A. CHERRY, OF CHICAGO, ILLINOIS, ASSIGNOR TO ECONOMY FUSE AND MANUFACTURING COMPANY, OF CHICAGO, ILLINOIS, A CORPORATION OF NEW YORK

MOLDED GEAR

Application filed June 17, 1931. Serial No. 545,081.

This invention relates to improvements in a molded gear or similar article formed from a composition consisting of a thermoplastic reactive resinous binder and a filler.

It is an object of the invention to disclose an improved molded gear which does not require machining of the gear teeth after molding and which will have a high degree of mechanical strength.

It is further an object of the invention to disclose a molded gear formed from a composition consisting of a thermoplastic reactive resinous binder and a filler consisting of relatively short pieces of spun fibrous string-like material.

Further objects and advantages will be more readily apparent from the following detailed description.

It has been common practice in the manufacture of molded gears to employ a laminated construction consisting of built-up layers of fabric and a resinous binder pressed and reacted in a mold but such a method will not permit flowing of the material during molding and it is therefore impossible to mold the gear teeth. It is necessary in this method to first form a molded blank and subsequently machine the gear teeth.

It is highly desirable for purposes of economy in manufacture to mold a gear directly from a molding composition which will flow in the mold in such a manner as to form the gear teeth. However, such moldable compositions as have been previously proposed which have the desired characteristics of flowability will not provide sufficient strength and shock resistance in the finished gear.

It has been suggested to use scrap fabric as a filler material which has been coated or impregnated with a resinous binder and although such a composition may be readily moldable to the desired shape, the tensile strength is found to be not materially greater than articles molded from a filler of wood flour or asbestos together with a resinous binder.

I have found that a satisfactory molding composition for use in the manufacture of gears is obtained by utilizing relatively short pieces of string-like material, such as twine or yarn, which retains its characteristics of spun and twisted fibers in the molded article. The string-like material is previously coated or impregnated with a thermoplastic reactive resinous binder and an intermingled mass of the material is placed in a mold and under the action of heat and pressure flows to form the gear while the resinous binder reacts to an infusible and insoluble binding body.

For example, a continuous length of yarn, such as cotton twine, may be coated or impregnated with a potentially reactive phenolic condensation product and after drying, the yarn or twine may be cut into short lengths whereby a molding composition, having a high degree of thermoplastic flow, is obtained. According to a preferred form, the yarn or twine may be cut into lengths from 1 to 1½ inches, but it is to be understood that shorter or longer lengths may be employed if so desired. The relative proportions of the filler and the resin in the composition may be approximately 60% filler and 40% resin, since it is found that the most satisfactory results are obtained when only sufficient resin is present to form a lubricant and a binder between the pieces of string. The resin, in acting as a lubricant, keeps the string filler out of frictional contact to permit flowability during molding. The resin during molding, after application of a sufficiently high temperature, reacts to an infusible and insoluble binding body.

The gear may be molded in a plunger mold in which the movable plunger is formed with gear teeth cooperating with internal gear teeth in the fixed part of the mold. In this form, substantially vertical compression only is required since the cross section of the plunger is the same as the gear to be molded. In another form the plunger may be smaller than the gear and have a simple cylindrical shape and the moldable composition is caused to flow outwardly by the vertical pressure of the plunger to form gear teeth in the fixed part of the mold. Substantially 30 to 80 pounds steam pressure is found to be sufficient in molding a gear having a 2½ inch face.

To assist in understanding this invention, a gear made in accordance with this disclosure is illustrated in the accompanying drawing, in which Figure 1 is a side elevation of a gear molded in the above described manner and, Figure 2 is a cross sectional view taken on the line 2—2 of Figure 1 and looking in the direction of the arrows. From the drawing, it will be noted that gear 10 is of any desired construction, that is of the usual form, having the gear teeth 11 molded thereon. It is preferable to provide a core 12 and in some instances, a keyway 13. All of these characteristics of the gear may be molded so as to eliminate the necessity for machining after the molding operation.

In the cross sectional figure, the molded spun fiber strings are diagrammatically represented at 14. Of course this figure does not show the exact arrangement or the quantity of string but illustrates merely that the gear is made up of the multiplicity of spun fibrous string-like pieces of short length in accordance with the above description.

The gear molded according to the method described does not require any subsequent machining and the mechanical strength is found to be comparable with molded gears of the laminated type. The tensile strength is found to be on the average of from 14,000 to 15,000 pounds per square inch and a maximum tensile strength of 18,000 pounds per square inch has been obtained. The resistance to fracture by impact is found, upon test, to be from 50 to 75 inch pounds.

I claim:

1. A toothed gear molded in situ and comprising a reacted phenolic condensation binder and a filler consisting of relatively short lengths of spun fibrous string-like material.

2. A toothed gear molded in situ and comprising an infusible and insoluble resinous binder and a filler consisting of relatively short lengths of spun fibrous string-like material.

3. A toothed gear molded in situ and comprising an infusible and insoluble resinous binder and a filler consisting of an intermingled mass of relatively short lengths of spun fibrous strings.

4. A toothed gear molded in situ and comprising an infusible and insoluble resinous binder and a filler consisting of pieces of spun fibrous string-like material in length between 1 and 1½ inches.

5. A toothed gear molded in situ and formed from a composition consisting of a thermoplastic reactive resin and a filler consisting of relatively short lengths of spun fibrous string-like material.

6. A toothed gear molded in situ and formed from a composition consisting of a potentially reactive phenolic condensation binder and a filler consisting of relatively short lengths of spun fibrous string-like material coated with the binder.

7. A toothed gear molded in situ and consisting of substantially 40% of an infusible and insoluble resinous binder and substantially 60% of a filler consisting of a plurality of short pieces of fibrous string material between 1 and 1½ inches in length.

Signed at Chicago, Illinois, this 15th day of June, 1931.

OSCAR A. CHERRY.